July 12, 1960   J. F. HARRIS ET AL   2,945,117
METHOD AND APPARATUS FOR REMOVING WELDING FLASH
Filed Jan. 28, 1958

INVENTOR
JEAN F. HARRIS
HARRY W. HORLACHER

2,945,117
METHOD AND APPARATUS FOR REMOVING WELDING FLASH

Jean F. Harris and Harry W. Horlacher, Warren, Ohio, assignors to The Taylor-Winfield Corporation, Warren, Ohio, a corporation of Ohio Filed Jan. 28, 1958, Ser. No. 711,636

15 Claims. (Cl. 219—97)

The present invention relates generally to the electric resistance welding art and has to do more particularly with the removal of flash from a completed weld. It is the primary or ultimate object of the present invention to provide improved methods and apparatus for removing welding flash from a completed weld whereby such removal may be carried out efficiently in a minimum of time.

As will be understood by those familiar with the welding art, it is conventional to pass low voltage-high amperage current through the edges of adjacent metal workpieces to soften the same. Then pressure is applied to the workpieces causing the softened edges to fuse thereby completing the weld. During the application of upset pressure to the workpieces some of the softened metal is forced outwardly in a direction normal to the direction of application of the upsetting pressure. This resultant flash is often undesirable and means must be provided for removing it from the point of weld. Prior art methods and apparatus have included separate trimming knives, rotating cutters, etc., spaced from the point of weld to remove the welding flash.

It is a more specific object of the invention to provide methods and apparatus for the removal of welding flash from a welded joint wherein the welding die assemblies themselves remove the flash. In this manner the need for ancillary equipment for removing the flash is eliminated.

A further object of the invention is to provide methods and apparatus for the removal of flash wherein the growth and the resultant shape of the flash are controlled so that the same may be easily removed. In accordance with this object, the welding die assemblies themselves are properly contoured to confine the flash to a desired shape.

Another object of the invention is the provision of improved methods and apparatus for actually removing the flash from the workpieces after the same has been loosened. As indicated above, the flash is confined to a specific shape and then removed. In the illustrated embodiment of the invention this shape is ring-like. The ring-like flash is first loosened from the weld by effecting relative movement between the welded workpieces and the properly contoured welding die assemblies and then split by separating the die members of each of the welding die assemblies so that the loosened flash is broken from the workpieces. Thus, the welding die assemblies not only form and free the flash but also break the same from the workpieces.

Another object of the invention is to provide means for removing the "fins" evidenced on a workpiece after welding. These fins are caused by the small separation between the relatively movable die members of the die assemblies. In one form of the invention separate scrapers are utilized while in another form such means are incorporated integrally as a part of the welding die assemblies.

Yet a further object of the invention is to provide methods and apparatus of the type described which are characterized by their extreme simplicity, ease of use, adjustability and low cost.

These, as well as other objects and advantages of the invention, will become more readily apparent upon consideration of the following specification and accompanying drawing wherein there is described and shown a preferred embodiment of the invention.

Figure 1:
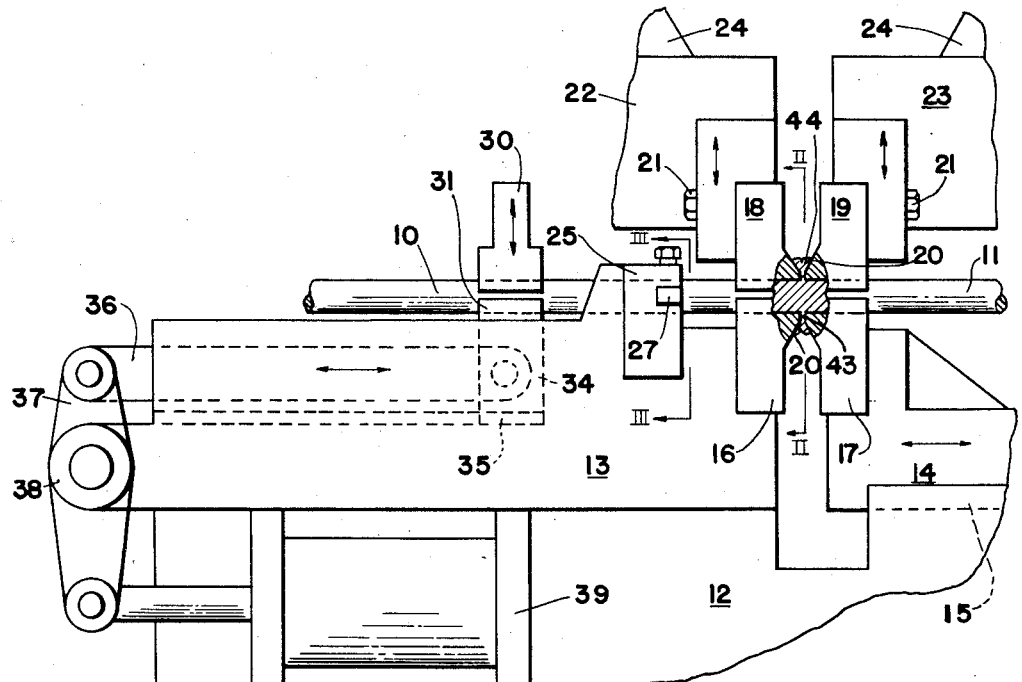
Figure 1 is a horizontal front view, partially in section, of a flash welder having means for removing flash constructed in accordance with the teachings of the present invention.
Figure 2:
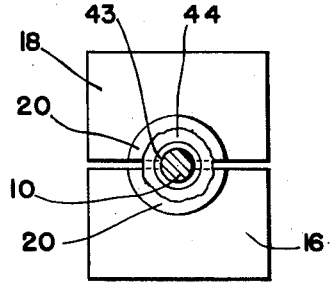
Figure 2 is a sectional view taken along the section line II—II of Figure 1 showing specifically the flash and the welding die assembly.

Referring now to the drawing, and initially to Figure 1 thereof, there is shown a flash welder having means to remove flash from welded workpieces constructed in accordance with the teachings of the present invention. The welder is used for joining a pair of rod-like workpieces 10 and 11 and then to remove the flash therefrom in a manner to be further explained. However, it should be understood from the outset that the teachings of the invention are not specifically limited to flash welders and/or rod-like workpieces but are equally applicable to other types of welders and various shaped workpieces as will be apparent to those skilled in the art.

The welder comprises a main frame 12 upon which are supported a stationary platen 13 and a movable platen 14. The stationary platen 13 is rigidly mounted with respect to the frame 12 while the movable platen 14 is slidable in ways 15 toward and away from the stationary platen upon proper actuation of suitable moving means, not specifically shown. An exemplary type of moving means is shown in U.S. Patent No. 2,724,035, entitled, "Actuating and Control Mechanism for Electric Resistance Flash-Butt Welder," and assigned to the assignee of the present invention, wherein a plurality of properly controlled fluid cylinders actuate the movable platen. This patent is made of record for those desiring a more complete description of such actuating means.

The platens 13 and 14 mount on the adjacent edges thereof in rigid relation with respect thereto lower die members 16 and 17, respectively. The lower die members 16 and 17 cooperate with like upper die members 18 and 19, respectively, to form a pair of opposed die assemblies. The die assemblies are preferably fabricated from current conductive material and are connected to a source of low voltage-high amperage electrical power. The die assemblies not only act as the workpiece engaging electrodes but they also form the clamping means for rigidly and securely holding the workpieces 10 and 11 during welding operations. Each of the die assemblies comprises a generally rectangular base portion and forwardly projecting frustum portion 20 split along its longitudinal axis to provide the upper and lower die members. The use of the properly shaped frustum portion for shaping, loosening and breaking away the welding flash will be hereinafter more fully explained.

The upper die members 18 and 19 are removably attached, by bolts 21, for example, to a pair of large and heavy welder clamps 22 and 23, respectively. Each of the welder clamps 22 and 23 has a rearwardly extending trunnion 24 which is connected to a fluid cylinder, not shown. The arrangement is such that upon proper actuation of the fluid cylinders the upper dies 18 and 19 mounted on the welder clamps 22 and 23 are caused to move into clamping relation with respect to the workpieces 10 and 11 and the lower dies 16 and 17.

Figure 3:
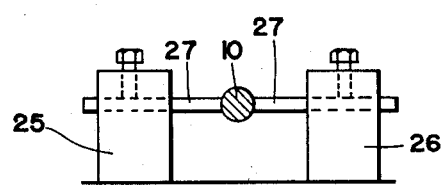
Figure 3 is a sectional view taken along the section line III—III of Figure 1 detailing the structure of the fin removing means.

Mounted on the stationary platen 13 to one side of the welding assembly are a pair of upwardly extending brackets 25 and 26 disposed on opposite sides of the workpiece 10. The brackets 25 and 26 each mount a replaceable and adjustable cutter bit 27 that extends toward the workpiece and is contoured so as to nest therewith. This arrangement is perhaps best shown in Figure 3 of the drawing and it will be noted that the tool bits engage opposite sides of the workpiece. The tool bits are disposed so as to be aligned with the cleft or break in the die assemblies between the upper die members 18 and 19 and the lower die members 16 and 17 for removing the fins from the workpieces. This last mentioned operation will be more fully explained later in the specification.

Also mounted on the stationary platen 13 to one side of the welding die assemblies and outwardly of the tool bits is a clamping assembly comprising upper and lower clamping members 30 and 31, respectively. The upper clamping member 30 is vertically movable by any convenient means, such as a fluid cylinder, not shown, so as to cooperate with the lower clamping member 31 in clamping the workpiece 10.

The clamping assembly is mounted on a slide block 34 that is slidably mounted in ways 35 for longitudinal movement toward and away from the tool bits and the welding die assemblies. The slide block is pivotally attached to one end of an outwardly extending driving link 36 whose other end is attached to a vertical driving link 37. Vertical driving link 37 is pivotally mounted intermediate its ends in clevis 38 extending from the stationary platen 13 and is connected to the piston rod of fluid cylinder 39 which is mounted from the frame 12. Upon proper actuation of the fluid cylinder 39 the slide block 34 and the clamping assembly carried thereby are caused to move toward or away from the welding die assemblies. Considering now the operation of the apparatus above described, it is assumed that the upper die members mounted on the welder clamps and the upper clamping member are vertically retracted whereby the welding die assemblies and the clamping assembly are open for the reception of workpieces. Normal operation of flash-butt welding apparatus of the type herein illustrated comprises a first step of positioning movable platen 14 a predetermined distance from fixed platen 13. The workpieces to be welded are then properly spaced with respect to the platens whereupon die members 18 and 19 are caused to close with respect to die members 16 and 17, respectively, to firmly grasp the workpieces. The actual welding operation may then be carried out by causing electrical current to pass through the contiguous end surfaces of each of the workpieces while effecting suitable advancing or closing movement of the movable platen 14 under sufficient upsetting pressure in the direction of fixed platen 13.

As previously mentioned, the upsetting pressure causes the softened edges of the workpieces to fuse together and forces metal outwardly of the welded joint. This flash is formed during the growth thereof into a ring-like shape by the coaction and configuration of the die members 16—19. This arrangement is important in accomplishing the objects of the invention and it will be noted from Figure 1 that the ring-like flash has a radially extending portion 43 of constant axial dimension—determined by the flat end surfaces of the die assemblies and the final separation of the platens—and a tread portion 44 having diverging side walls and a greater axial dimension than the radially extending portion 43. The shape of the tread portion is determined by the sloping side walls of the frustrum portions 20 of the welding die assemblies.

Also, because the die members clamp the workpieces under pressure during welding, the end portions of the workpieces are softened and the upper and lower die members of the die assemblies are slightly separated, radially projecting and oppositely disposed fins 45 are formed on the workpieces on both sides of the weld.

The operator now actuates the fluid cylinders controlling the movement of the upper die members 18 and 19 to relieve the pressure therefrom. However, these die members remain in the down position in contact with the workpieces. The next step is the energization of fluid cylinder 39 to cause movement of the slide block, the clamping assembly and the welded workpieces in a direction away from the welding die assemblies. Pulling of the workpieces to the left as seen in Figure 1 moves the welded joint through the welding die assembly mounted on the stationary platen and the flash is loosened from the weld zone but remains as a loose washer-like member around the workpieces.

To remove the loosened washer-like flash, fluid is applied to the appropriate fluid cylinders for raising the upper die members 18 and 19. The separation of the upper and lower die members caused by the raising of the upper die members splits the washer in half so that the same falls away from the welded workpieces. It will be noted that the tread portion 44 of the flash prevents retraction of the upper die members without the breaking apart of the flash.

The fins are removed upon continued movement of the welded workpieces to the left away from the die assemblies by the inwardly projecting tool bits 27 which shave such excess metal from the workpieces. It is, of course, contemplated that the tool bits will be replaceable for removing the fins from different sized and shaped workpieces and for maintenance.

Figure 5:
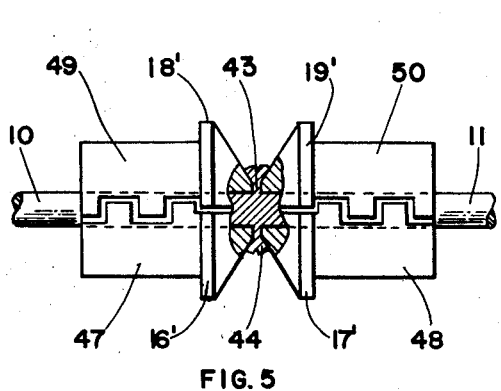
Figure 5 is a side view of welding die assemblies having integral means for removing the fins from a workpiece.
Figure 4:
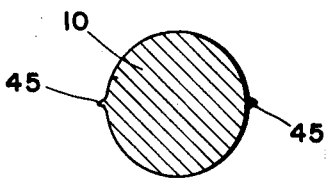
Figure 4 is a sectional view of a workpiece showing the fins formed thereon during welding.

In Figure 5 of the drawing there is shown an alternate arrangement wherein the fin removing means are integral with the die members and welding assemblies. In this embodiment of the invention die members 16'—19' are formed with rearwardly extending portions 47, 48, 49 and 50 respectively. It will be noted that the meeting pairs of these rearwardly extending portions are stepped in alternate fashion and are adapted to nest with respect to each other when the die assemblies are in clamping relation. When the workpieces are moved in either direction after welding and prior to the retraction of the upper die members the fins will be removed as is readily apparent.

After the fins have been removed the workpieces are disengaged and the various assemblies of the welder are returned to their initial positions preparatory to another welding operation. Of course, control instrumentalities can be employed to cause automatic cycling of the welder if so desired.

Although we have shown and disclosed an illustrated embodiment of the invention, it should be understood that many changes may be made therein without departing from the teachings thereof. Accordingly, reference should be had to the following appended claims in determining the true scope of the invention.

We claim:

1. Flash welding apparatus comprising a pair of opposed welding die assemblies, each of said welding die assemblies being split to provide an upper and lower die member, means to separate said upper and lower die members, each of said die assemblies having an end face of predetermined shape, and said shapes being such that the welding flash about welded workpieces is broken away therefrom by separation of said die members.

2. Apparatus according to claim 1 further characterized in that said welder comprises means for moving said welded workpieces from said welding dies, said welded workpieces having longitudinally extending fins formed thereon due to the separation between said upper and lower die members, cutting means for removing said fins from said workpieces, and said cutting means spaced longitudinally outwardly of said welding die assemblies in the direction of movement of said welded workpieces.

3. Apparatus according to claim 2 further characterized in that at least one of said die members has a rearwardly projecting portion extending away from said end face thereof, the meeting faces of said rearwardly projecting portions of said upper and lower die members being alternately stepped and adapted to nest with each other, and said rearwardly projecting portions forming said cutting means.

4. The method of removing welding flash from welded workpieces which comprises the steps of clamping a pair of opposed workpieces under pressure by clamping means, welding said workpieces, relieving the clamping pressure from said clamping means while the same are still in contact with said welded workpieces, moving said welded workpieces relative to said clamping means to cause said welding flash to abut against said clamping means, and continuing movement of said welded workpieces to loosen said welding flash therefrom.

5. A welder having a weld zone and adapted to soften and fuse together workpieces in said weld zone, means to remove welding flash from the welded workpieces, said last mentioned means comprising a pair of flash removing members extending into said weld zone from opposite sides thereof, said flash removing members controlling the growth and resultant shape of said welding flash, said welder further comprising means to relatively move said welded workpieces and said flash removing members, and the arrangement being such that one of said flash removing members engages said welding flash to loosen said welding flash from said workpieces upon actuation of said means to relatively move.

6. A welder having a weld zone and adapted to soften and fuse together workpieces in said weld zone, means to remove welding flash from the welded workpieces, said last mentioned means comprising a pair of flash removing members extending into said weld zone from opposite sides thereof, said flash removing members controlling the growth and resultant shape of said welding flash, said welder further comprising a pair of opposed workpiece clamping die assemblies adapted to engage said workpieces during welding, each of said die assemblies having an integral inwardly projecting portion, said inwardly projecting portion forming said flash removing means, each of said die assemblies being split to provide upper and lower die members, means to separate said die members, and said die assemblies being adapted to break away said welding flash from said workpieces upon separation thereof.

7. The method of removing welding flash from welded workpieces which comprises the steps of controllably forming the shape of the welding flash during the growth thereof during welding operations into a ring-like gathering, moving said welded workpieces and said gathering relative to flash removing means to loosen said ring-like gathering, and thereafter splitting said loosened ring-like gathering whereby the same is removed from said welded workpieces.

8. The method of removing welding flash and the longitudinally extending fins from welded workpieces which comprises the steps of controllably forming the shape of the welding flash during the growth thereof during welding operations into a ring-like gathering, moving said welded workpieces and said gathering relative to flash removing means to loosen said ring-like gathering, splitting said loosened ring-like gathering whereby the same is removed from said welded workpieces, and cutting said fins from said welded workpieces.

9. Flash welding apparatus for welding workpieces comprising a first platen, a second platen, means for effecting relative longitudinal movement of said platens toward and away from each other, a welding die assembly mounted on each of said platens, each of said welding assemblies comprising an upper and lower die member adapted to clamp a workpiece therebetween, means to vertically separate said upper and lower die members, each of said welding assemblies having an inwardly projecting frustum portion, said welding assemblies being split along the longitudinal axes thereof to define said upper and lower die members, said frustum portions providing means for controlling the growth of the welding flash forced transversely outwardly of said workpieces at the point of weld during welding operations, and said frustum portions providing means for breaking away said welding flash from the welded workpieces when said upper and lower die members are vertically separated.

10. Apparatus according to claim 9 further comprising a workpiece clamping assembly mounted on one of said platens in longitudinally aligned and spaced relation with respect to said welding die assemblies, means to move said workpiece clamping assembly longitudinally toward and away from said welding die assemblies, and said frustum portions providing means for loosening said welding flash from said welded workpieces upon longitudinal movement of said clamping means with said welded workpieces clamped thereby relative to said welding die assemblies.

11. Apparatus according to claim 9 further comprising means to effect relative movement between said welded workpieces and said welding die assemblies, and said frustum portions providing means for loosening said welding flash from said welded workpieces upon actuation of said means to effect relative movement.

12. Apparatus according to claim 9 further characterized in that said welded workpieces have longitudinally extending fins formed thereon due to the separation between said upper and lower die members, fin removing means mounted in longitudinally aligned and spaced relation with respect to said welding die assemblies, and means to effect relative longitudinal movement between said welded workpieces and said fin removing means to remove said fins.

13. The method of removing welding flash from welded workpieces which comprises the steps of controllably forming the shape of the welding flash during the growth thereof during welding operations into a ring-like gathering, and moving said welded workpieces and said gathering relative to flash removing means to loosen said ring-like gathering from said welded workpieces.

14. The method according to claim 13 wherein said welded workpieces have longitudinally extending fins adjacent the weld which comprises the further step of cutting said fins from said welded workpieces.

15. A welder having a weld zone and adapted to soften and fuse together workpieces in said weld zone, means to remove welding flash from the welded workpieces, said last mentioned means comprising a pair of flash removal members extending into said weld zone from opposite sides thereof, means to control the growth and resultant shape of said welding flash, means to relatively move said welded workpieces and said flash removing members, and said flash removal members engaging said welding flash to remove the same from said workpieces upon actuation of said means to relatively move.

References Cited in the file of this patent
UNITED STATES PATENTS

| | | |
|---|---|---|
| 2,124,849 | Drain | July 26, 1938 |
| 2,272,737 | Chapman | Feb. 10, 1942 |

FOREIGN PATENTS

| | | |
|---|---|---|
| 456,326 | Great Britain | Mar. 6, 1936 |
| 342,289 | Germany | Oct. 15, 1921 |